United States Patent
Bonicatto et al.

(10) Patent No.: US 9,094,153 B2
(45) Date of Patent: *Jul. 28, 2015

(54) DYNAMIC MODULATION SELECTION

(71) Applicant: Landis+Gyr Technologies, LLC, Pequot Lakes, MN (US)

(72) Inventors: Damian Bonicatto, Pequot Lakes, MN (US); Stuart L. Haug, Hackensack, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,900

(22) Filed: Mar. 12, 2014

(65) Prior Publication Data

US 2014/0192906 A1 Jul. 10, 2014

Related U.S. Application Data

(63) Continuation of application No. 12/756,344, filed on Apr. 8, 2010, now Pat. No. 8,681,619.

(51) Int. Cl.
*H04L 1/00* (2006.01)
*H04L 12/10* (2006.01)
*H04L 27/00* (2006.01)

(52) U.S. Cl.
CPC ............ *H04L 1/0003* (2013.01); *H04L 1/0021* (2013.01); *H04L 12/10* (2013.01); *H04L 27/0008* (2013.01)

(58) Field of Classification Search
None
See application file for complete search history.

(56) References Cited

U.S. PATENT DOCUMENTS

| 5,581,229 | A | 12/1996 | Hunt |
| 6,154,488 | A | 11/2000 | Hunt |
| 6,177,884 | B1 | 1/2001 | Hunt et al. |
| 6,775,324 | B1 * | 8/2004 | Mohan et al. ................. 375/238 |
| 6,998,963 | B2 | 2/2006 | Flen et al. |
| 7,055,090 | B2 * | 5/2006 | Kikuchi et al. ............... 714/801 |
| 7,102,490 | B2 | 9/2006 | Flen et al. |
| 7,145,438 | B2 | 12/2006 | Flen et al. |
| 7,180,412 | B2 | 2/2007 | Bonicatto et al. |
| 7,184,861 | B2 | 2/2007 | Petite |
| 7,209,840 | B2 | 4/2007 | Petite et al. |
| 7,224,740 | B2 | 5/2007 | Hunt |

(Continued)

FOREIGN PATENT DOCUMENTS

| KR | 20040013175 A | 2/2004 |
| WO | WO 2009006685 A1 * | 1/2009 |

(Continued)

*Primary Examiner* — Ayaz Sheikh
*Assistant Examiner* — Faiyazkhan Ghafoerkhan
(74) *Attorney, Agent, or Firm* — Crawford Maunu PLLC

(57) ABSTRACT

Methods, systems, and apparatus, including computer programs encoded on a computer storage medium, for transmitting data. In one aspect, a method obtains a baseline data rate for transmissions from a node that are received over a channel of a power line communications system and a set of available modulation techniques for the node. The set of available modulation techniques can include at least two modulation techniques with which the node is configured to encode data that are transmitted over the channel. Using the set of available modulation techniques, a modulation technique that is capable of providing at least the baseline data rate with at least a threshold confidence for the node is selected. In turn, data is provided to the node specifying the selected modulation technique.

20 Claims, 5 Drawing Sheets

(56) References Cited

U.S. PATENT DOCUMENTS

| | | | |
|---|---|---|---|
| 7,236,765 B2 | 6/2007 | Bonicatto et al. | |
| 7,346,463 B2 | 3/2008 | Petite et al. | |
| 7,428,270 B1 * | 9/2008 | Dubuc et al. | 375/316 |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,499,515 B1 * | 3/2009 | Beadle | 375/358 |
| 7,555,064 B2 * | 6/2009 | Beadle | 375/316 |
| 7,688,849 B2 * | 3/2010 | Rabie et al. | 370/466 |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 8,681,619 B2 * | 3/2014 | Bonicatto et al. | 370/232 |
| 2003/0031122 A1 * | 2/2003 | Kim et al. | 370/209 |
| 2003/0202499 A1 * | 10/2003 | Thron et al. | 370/342 |
| 2004/0056734 A1 * | 3/2004 | Davidow | 333/100 |
| 2004/0086054 A1 * | 5/2004 | Corral | 375/260 |
| 2004/0122531 A1 * | 6/2004 | Atsuta et al. | 700/1 |
| 2006/0088056 A1 * | 4/2006 | Quigley et al. | 370/468 |
| 2007/0110035 A1 * | 5/2007 | Bennett | 370/352 |
| 2007/0222637 A1 * | 9/2007 | Davidow | 340/870.02 |
| 2008/0025386 A1 * | 1/2008 | Desset et al. | 375/239 |
| 2008/0184087 A1 * | 7/2008 | Hayashi | 714/751 |
| 2008/0304595 A1 | 12/2008 | Haug et al. | |
| 2009/0052464 A1 * | 2/2009 | Gardner et al. | 370/436 |
| 2009/0279638 A1 * | 11/2009 | Kurobe et al. | 375/295 |
| 2009/0303916 A1 * | 12/2009 | Winkler et al. | 370/315 |
| 2010/0246527 A1 * | 9/2010 | Montojo et al. | 370/330 |
| 2011/0043374 A1 * | 2/2011 | Bannister et al. | 340/870.02 |
| 2011/0121952 A1 * | 5/2011 | Bonicatto et al. | 340/12.32 |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0057592 A1 | 3/2012 | Zeppetelle et al. | |
| 2012/0076212 A1 | 3/2012 | Zeppetelle et al. | |
| 2012/0084559 A1 | 4/2012 | Bonicatto | |
| 2012/0106664 A1 | 5/2012 | Bonicatto et al. | |
| 2012/0163436 A1 * | 6/2012 | Stadelmeier et al. | 375/222 |
| 2012/0328030 A1 * | 12/2012 | Stadelmeier et al. | 375/257 |

FOREIGN PATENT DOCUMENTS

| | | |
|---|---|---|
| WO | WO 2009006685 A1 | 1/2009 |
| WO | 2011031160 | 10/2011 |

* cited by examiner

DYNAMIC MODULATION SELECTION

BACKGROUND

This specification relates to data communications.

Service providers utilize distributed networks to provide services to customers over large geographic areas. For example, communications companies utilize a distributed communications network to provide communications services to customers. Similarly, power companies utilize a network of power lines and meters to provide power to customers throughout a geographic region and receive data back about the power usage.

These service providers are dependent on proper operation of their respective networks to deliver services to the customers and receive data back regarding the services provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication networks, nodes in the network (e.g., meters, load control switches, remote service switches, and other endpoints) can provide updated information (e.g., power consumption information and/or node operating status information) by transmitting data over power lines. To increase the amount of data that can be provided over the power lines, the transmitters used by the meters utilize modulation techniques to encode multiple bits of data into the transmissions. For example, a node can use Quadrature Phase Shift Keying modulation to provide two bits of data. Similarly, a node can use 16 Quadrature Amplitude Modulation to provide four bits of data.

Different nodes communicating over a power line communication network (and many other networks), may have various data transmission requirements. For example, a first node may be required to provide twice as much data as another node. Additionally, the channels over which the nodes communicate can have various different channel characteristics. In the example above, the first node may communicate over a channel having a noise floor that is significantly lower than the other node.

Due to the various data rates that can be required of the nodes, as well as the substantial differences in channel characteristics, it can be difficult to select a modulation technique that provides for efficient transmission of data for each node. Further, the channel characteristics can vary significantly over time such that modulation techniques that are selected for the nodes at one point in time may not provide adequate performance at another point in time. In view of the challenges, modulation technique selection that considers the conditions in which the node is operating can facilitate more efficient data transmission.

SUMMARY

In general, one innovative aspect of the subject matter described in this specification can be embodied in methods that include the actions of obtaining data specifying a baseline data rate for transmissions from a node that are received over a channel of a power line communications system; obtaining a set of available modulation techniques for the node, the set of available modulation techniques including at least two modulation techniques with which the node is configured to encode data that are transmitted over the channel; selecting a modulation technique for the node, the selected modulation technique being a modulation technique from the set of available modulation techniques, wherein the selected modulation technique is capable of providing data with at least the baseline data rate with at least a threshold confidence; and providing, to the node, data specifying the selected modulation technique.

These and other embodiments can each optionally include one or more of the following features. Methods can further include the actions of determining a signal to noise threshold associated with the selected modulation technique, the signal to noise threshold for the modulation technique being a minimum signal to noise measure at which the modulation technique provides the baseline data rate with at least the threshold confidence; determining a noise floor for one or more available channels, each available channel being a portion of a spectrum that is available to be allocated for transmissions from the node, the available channel having a channel bandwidth over which transmissions from the node are authorized; and selecting an available channel for the node, the selected channel being a channel over which the selected modulation technique can provide the baseline data rate with at least the threshold confidence.

Determining a signal to noise threshold can include determining a threshold $E_b/N_o$ ratio at which the selected modulation technique provides the baseline data rate with less than a specified bit error rate. Selecting an available channel can include selecting an available channel having a noise floor with which an $E_b/N_o$ ratio for the transmissions is at least equal to the threshold $E_b/N_o$ ratio. Data can be provided that cause presentation of a user interface that accepts user input specifying the baseline data rate.

Obtaining a set of available modulation techniques can include receiving data, from a data store, specifying the set of available modulation techniques that are associated with the node. The set of available modulation techniques can include at least two modulation techniques selected from a set consisting of PSK, FSK, QAM, and MFSK modulation techniques.

Methods can further include the actions of monitoring signal characteristics of transmissions from a node, the transmissions being data that are encoded using the selected modulation technique; determining that the selected modulation technique is not providing at least the baseline data rate with at least the threshold confidence; selecting, based on the monitored signal characteristics, a different modulation technique for the node, the different modulation technique being a modulation technique that provides, for transmissions having the monitored signal characteristics, at least the baseline data rate with at least the threshold confidence; and providing data to the node specifying the different modulation technique.

Determining that the selected modulation technique does not provide at least the baseline data rate with at least the threshold confidence can include determining that a bit error rate for the monitored transmissions is higher than a threshold bit error rate. Determining that the selected modulation technique does not provide at least the baseline data rate with at least the threshold confidence can include determining that an $E_b/N_o$ ratio for the transmissions is below a threshold $E_b/N_o$ ratio.

The node can be a utility meter, and obtaining data specifying a baseline data rate can include obtaining data specifying a bit rate at which updated meter information is provided with a specified update rate. The utility meter can be a power meter, and the updated meter information can be billing information with which a cost of power consumption is computed.

The updated meter information can be line voltage information that specifies a line voltage amplitude at the power meter.

Methods can further include the actions of monitoring signal characteristics of transmissions from a node, the transmissions being data that are encoded using the selected modulation technique; determining that the selected modulation technique is not providing at least the baseline data rate with at least a threshold confidence; selecting, based on the signal characteristics, a different channel for the node, the different channel being a channel over which transmissions having the monitored signal characteristics provide the baseline data rate with at least the threshold confidence; providing data to the node specifying the different channel; and receiving transmissions from the node over the different channel. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Efficient communications can be achieved by selecting modulation techniques based on available channel bandwidth, channel characteristics, a baseline data rate for the data, and/or signal characteristics of transmissions that are transmitted over the channels. Efficient communications can be maintained even when channel and/or signal characteristics change by monitoring the transmissions and selecting different modulation techniques and/or channels in response to current modulation techniques failing to provide at least a baseline data rate with at least a threshold confidence.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A modulation technique that is used by a meter (or another node) for transmitting data over a power line communications system can be selected based on a baseline data rate for the transmissions and channel characteristics of a channel (i.e., a portion of spectrum) over which the meter communicates. The baseline data rate can be a minimum bit rate (or another specified data rate) at which the meter can provide updated meter information (e.g., power readings, voltage readings, meter operating status information, meter status information, and/or other information provided by the meter) with at least a specified update rate (e.g., every hour). The characteristics of the channel can include, for example, an available bandwidth for the channel, a noise floor for the channel, and other characteristics of the channel. The modulation technique that is selected can be a modulation technique that provides at least the baseline data rate given the characteristics of the channel.

As described in detail below, once a modulation technique has been selected for the meter, signal characteristics (e.g., signal amplitude, signal to noise ratios, signal energy over time) of transmissions from the meter and/or the channel characteristics (e.g., noise floor measures, available bandwidth) can be continuously or periodically monitored, and different modulation techniques can be dynamically selected for the meter in response to changes in the signal and/or channel characteristics.

The description that follows describes selection of a modulation technique by a modulation analysis apparatus that is coupled to a substation processing unit. However, the modulation analysis apparatus can be an integral component of the substation processing unit. Additionally, the modulation analysis apparatus can also be implemented such that the modulation analysis apparatus is coupled to (or is an integral component of) a node, a network management system, or another data processing apparatus.

Figure 1:
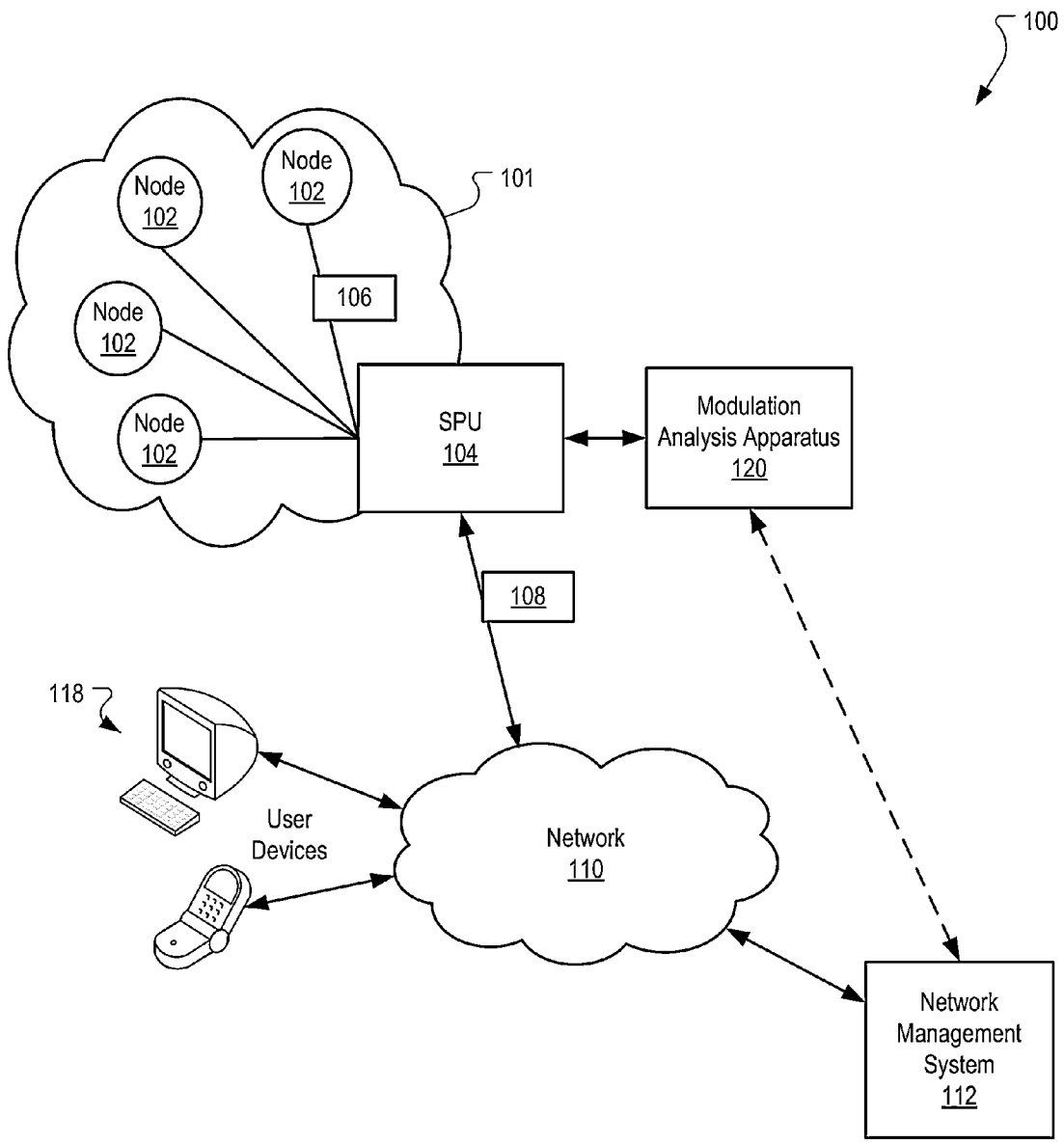
FIG. 1 is a block diagram of an example network environment in which nodes transmit data.

FIG. 1 is a block diagram of an example network environment 100 in which nodes transmit data. The network environment 100 includes a service network 101 in which a plurality of nodes 102 are coupled (e.g., communicatively coupled) to a substation processing unit 104. The nodes 102 can be any device capable of transmitting data in the network environment 100, and are also referred to as endpoints. For example, the nodes 102 can be meters in a utility network, computing devices, television set top terminals or telephones that transmit data in the service network. The description that follows refers to the nodes 102 as power meters in a power distribution network. However, the description that follows is applicable to other types of nodes 102 in utility networks or other networks. For example, the description that follows is applicable to gas meters and water meters that are respectively installed in gas and water distribution networks. The description is also applicable with reference to any methods, apparatus, or systems that use modulation techniques to encode data for transmission.

The nodes 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The nodes 102 report the operating characteristics of the network over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication (PLC) systems that dynamically allocate available bandwidth according to an orthogonal frequency division multiple access (OFDMA) spectrum allocation technique.

Using OFDMA each node 102 is assigned a subset of available data sub-carriers, such that multiple nodes can simultaneously transmit data over the service network 101, even when the nodes 102 have different bandwidth requirements. For example, when a modulation technique being used to transmit data from one node requires more bandwidth than that required by another modulation technique that is being used to transmit data from a second node, the first node can be allocated more sub-carriers (i.e., bandwidth) than the second node. In some implementations, a channel is a set of two or more contiguous sub-carriers, while in other implementations, a channel is a set of any one or more sub-carriers. OFDMA is described throughout this document as an example spectrum allocation technique, but other allocation techniques can also be used (e.g., Time Division Multiple Access, Code Division Multiple Access, and other Frequency Division Multiple Access techniques).

OFDMA sub-carriers and/or channels can be allocated in an order that is based on characteristics of the sub-carrier (or channel). For example, the sub-carriers (or channels) can each be ranked according to their respective noise floors (e.g., ranked in ascending order of noise floor). In these implementations, the quietest sub-carriers (i.e., the sub-carriers having the lowest noise floor) are allocated before sub-carriers having higher noise floors. The noise floor of a sub-carrier and/or a channel can be, for example, an average amplitude of noise signals that are measured across the spectrum of the sub-carrier and/or channel. The average amplitude of noise can be the average noise on the channel over a specified period such as a previous hour, day, or week. The noise floor can also be specified as a maximum noise floor, a median noise floor, or another statistical measure of noise across the spectrum of the sub-carrier and/or channel.

When the nodes 102 are implemented as power meters in a power distribution network, the data transmitted by the power meters can represent measures of total power consumption, power consumption over a specified period of time, peak power consumption, instantaneous voltage, peak voltage, minimum voltage and other measures related to power consumption and power management (e.g., load information). Each of the power meters can also transmit status data that specifies a status of the power meter (e.g., operating in a normal operating mode, emergency power mode, or another state such as a power outage state).

In some implementations, the data representing the updated meter information (e.g., data representing measures of power consumption and/or status data) are continuously or intermittently transmitted over a specified unit interval. A unit interval is a period of time over which a particular symbol (i.e., one or more bits) is transmitted. A unit interval for each symbol transmitted by a power meter can be less than or equal to the time interval (i.e., 1/update rate) at which updated meter information is required to be provided. For example, assume that a particular meter is required to provide updated meter information every 20 minutes (i.e., the specified update rate for the meter). In this example, a meter can transmit a symbol representing a first set of updated meter information for twenty minutes, and then transmit another symbol representing a next set of updated meter information for a subsequent twenty minutes.

As described below, the update rate and/or unit interval for a meter can be specified by a network administrator based, for example, on types and amounts of updated meter information that are being received from the meter, preferences of a customer (e.g., a power company) to whom the data is being provided, and/or channel characteristics of the channel over which the data is being transmitted.

A number of bits that can be transmitted by each symbol over each unit interval can depend on a modulation technique that is used. For example, each symbol of data transmitted using 64 QAM (Quadrature Amplitude Modulation) can include 6 bits of data, while differential phase-shift keying facilitates encoding two bits of data in each symbol. Throughout this document various modulation techniques that achieve various respective bit rates are described, but other modulation techniques can also be used to achieve other bit rates.

In some implementations, the nodes 102 transmit the operating characteristics of the service network 101 over communications channels to a substation processing unit 104. The substation processing unit (SPU) 104 is a processing apparatus that receives communications from nodes 102 to manage the service network 101 or for transmission though a data network 110. For example, the SPU 104 can include a receiver that receives symbols 106 from the nodes 102 and logs data from the symbols. The SPU 104 can also take action based on the data received from the nodes 102 or transmit the symbols 106 to a network management system 112 that manages the service network 101. The SPU 104 can transmit the individual symbols 106 or generate a consolidated packet 108 that includes data from multiple symbols 106 received from the nodes 102.

The symbols 106 that are received from the nodes 102 include data representing updated meter information. The data representing updated meter information can include data representing various operating conditions corresponding to the node from which the symbol 106 was received as well as power utilization (also referred to as power consumption) and billing information. For example, the symbols 106 can include data reporting monthly, daily, or hourly power usage as measured by a power meter. Similarly, the symbols 106 can include data reporting detection of a power outage or power restoration event. In some implementations, a single SPU 104 can be configured to receive symbols 106 from thousands of nodes 102 and transmit the symbols 106 through a data network 110.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only one SPU 104 is shown, the service network 101 can include many different SPUs 104 that can each communicate with thousands of nodes 102.

In some implementations, the data network 110 couples the SPU 104 to the network management system 112. The network management system 112 is a system that monitors and/or controls the service network 101. The network management system 112 can control different characteristics of the service network 101 based on data received from nodes 102 that are installed in the service network 101.

For example, in a PLC network, the network management system 112 can receive data indicating that power usage is significantly higher in a particular portion of a power network than in other portions of the power network. Based on this data, the network management system 112 can allocate additional resources to that particular portion of the network (i.e., load balance) or provide data specifying that there is increased power usage in the particular portion of the power network.

The network management system 112 can provide data from the symbols to a user device 118 that can be accessed, for example, by the network operator, maintenance personnel and/or customers. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to the user device 118. Similarly, if the symbols 106 indicate that there has been a power outage, the network management system 112 can provide data to user devices 118 that are accessible by customers to provide information regarding the existence of the outage and potentially provide information estimating a duration of the outage.

Symbols 106 from a particular node 102 may be transmitted over one of thousands of channels in a PLC system. Each channel can have different channel characteristics (e.g., noise floor, bandwidth,) and the transmission path for some nodes can be substantially different than that of other nodes. For example, one particular channel in a PLC network may have a noise floor that is 6 dB higher than that of another channel in the PLC system. Similarly, one node 102 can be located substantially further away from the SPU 104 than another node, such that transmissions received from the node 102 that is closer to the SPU 104 may have a higher amplitude than the symbols received from the other node 102 that is further away from the SPU 104.

In view of the differences between the channel characteristics of different channels that can exist, differences between transmission path lengths over which the nodes 102 communicate, as well as differences between the baseline data rates for nodes 102, it can be difficult to select a single modulation technique with which efficient symbol transmission can be continuously achieved. For example, assume that one node is required to transmit 6 bits of data over each unit interval, while a second node is required to transmit 2 bits of data over each unit interval. In this example, each of the nodes 102 can use a first modulation technique that encodes 6 bits of data in each symbol. However, in this example, the bandwidth used to transmit the 2 bits of data for the second node can be reduced when a second modulation technique that encodes 2 bits of data using less bandwidth is available. Thus, available bandwidth can be more efficiently utilized when the first node uses the first modulation technique to encode and transmit data, while the second node uses the second modulation technique to encode and transmit data.

As characteristics of the service network 101 change, the signal characteristics (e.g., signal amplitude and signal to noise ratios) of symbols 106 transmitted in the network also change. For example, when a capacitor bank is activated, the amplitudes of signals received at the SPU 104 can fall because the impedance of the capacitor bank can be lower than that of the SPU 104, and therefore, more current flows to the capacitor bank than the SPU 104. Channel characteristics of the channels over which the symbols are transmitted can also vary over time, for example, due to changes in the environment in which the service network 101 is located (e.g., increased noise from noise sources near components of the network).

The ability to reliably receive data over the channels in the PLC system can be affected by changes to the signal characteristics of the symbols 106 and/or channel characteristics of the channels over which the symbols 106 are transmitted. Therefore, monitoring the signal and/or channel characteristics and, in turn, dynamically selecting modulation techniques for the nodes 102 can facilitate more reliable communications with the nodes 102.

For example, when a noise floor of a particular channel increases, reliably recovering symbols that are transmitted over that particular channel can become more difficult because it may be more difficult to distinguish the symbols 106 from the noise floor (e.g., the $E_b/N_o$ ratio of the symbols fall below a threshold $E_b/N_o$ ratio, where Eb/No is a ratio of energy per bit relative to the spectral noise density). In this example, the symbols 106 received over the particular channel may be more reliably recovered when the $E_b/N_o$ ratio (or another measure of the signal relative to the noise floor) is increased. As described in more detail below, the $E_b/N_o$ ratio may be increased, for example, by using a different modulation technique than that currently being used by the node 102. Alternatively, if another channel that has a lower noise floor is available, the node 102 can be configured to transmit data over the other channel. The $E_b/N_o$ ratio is used throughout this document for example purposes, but other relative measures of signal amplitude, as well as other measures of signal quality can be used.

The SPU 104 (or the network management system 112) includes a modulation analysis apparatus 120 that analyzes baseline data rates for nodes, channel characteristics of available channels over which the nodes can communicate, and selects modulation techniques that are used by the nodes 102 (and/or SPU 104) to encode and transmit data through the service network 102. For example the modulation analysis apparatus (MAA) 120 can obtain data specifying the baseline data rate for a particular node and a set of available modulation techniques that the node can use to encode data. In turn, the MAA can select a modulation technique from the set of available modulation techniques and provide data to the power meter specifying the selected modulation technique. As described in more detail below, the selected modulation technique can be a modulation technique that provides at least the baseline data rate, for example, given the channel characteristics of the channel that has been allocated to the node.

Once the MAA 120 has selected a modulation technique for a node, the MAA 120 can continue to monitor channel characteristics of the channel over which the node communicates, as well as signal characteristics of the symbols that are received over the channel. Using the signal and/or channel characteristics, the MAA 120 can determine whether a different modulation technique should be selected for the node 102. For example, if the Eb/No ratio for the transmissions being received from the power meter are below a threshold Eb/No ratio and/or the bit error rate of the transmissions are above a maximum acceptable bit error rate, the MAA 120 can determine that a different modulation technique should be selected.

In response to determining that a different modulation technique should be selected, the MAA 120 can again select a modulation technique from the set of available modulation techniques and provide the node with data specifying that the node 102 use the newly selected modulation technique. The MAA 120 can also provide data to the node 102 specifying that the node 102 use the same channel or a different channel to communicate with the SPU 104. When the MAA 120 provides data to a node 102 specifying a new modulation technique for the node 102 and/or a new channel for the node 102, the MAA 120 can also provide the data to the SPU 104 and/or other network components with which the node 102 communicates to ensure that the node 102 and the SPU 104 are configured appropriately.

Figure 2:
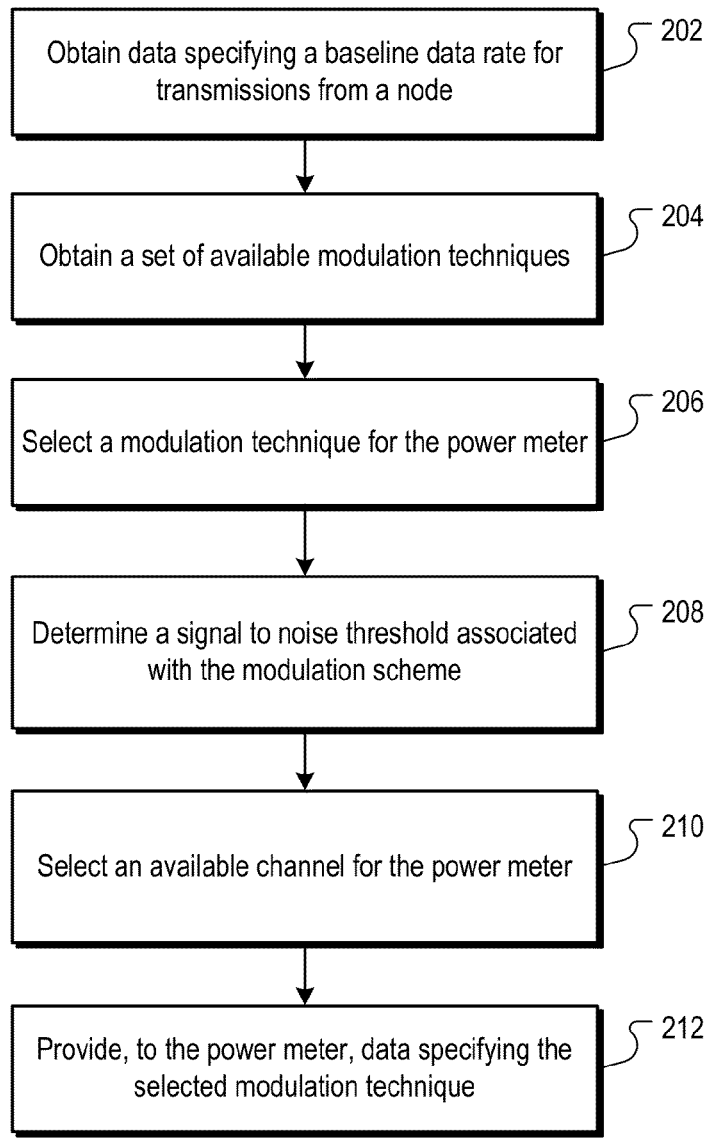
FIG. 2 is a flow chart of an example process for selecting a modulation technique for a node.

FIG. 2 is a flow chart of an example process 200 for selecting a modulation technique for a node. The process 200 is a process by which data specifying a baseline data rate for a node and a set of available modulation techniques are obtained. Using the baseline data rate and the set of available modulation techniques, a modulation technique is selected for the node. In turn, data that specifies the selected modulation technique is provided to the power meter.

The process 200 can be implemented, for example, by the modulation analysis apparatus (MAA) 120 and/or network management system 112 of FIG. 1. In some implementations, the MAA 120 includes one or more processors that are configured to perform actions of the process 200. In other implementations, a computer readable medium can include instructions that when executed by a computer cause the computer to perform actions of the process 200.

Data specifying a baseline data rate for the node are obtained (202). In some implementations, the baseline data rate for the node is the minimum bit rate at which the node provides specified data. For example, the baseline data rate for a power meter that is implemented in a PLC network can be a minimum bit rate at which the power meter provides updated meter information at a specified update rate. As described above, transmissions from a power meter can include symbols that represent updated meter information, where the updated meter information includes data specifying measures of power utilization and status data representing the status of the node from which the symbols are received as well as other information.

In some implementations, the update rate for a meter can be specified by a network administrator and universally (or selectively) applied to the nodes. For example, a network administrator can specify that the update rate for each node is 1 hour, such that each node is to provide updated meter information on an hourly basis. In this example, the unit interval can also be set to 1 hour (assuming that a single symbol can include a sufficient number of bits to provide the updated meter information). In these and other implementations, data that cause presentation of a user interface that accepts (e.g., through selection of a menu element, data entered into a text box, or input using another user interface element) user input specifying the baseline data rate can be provided. In turn, the network administrator (or another user) can enter the baseline data rate using the user interface that is presented.

In other implementations, the update rate at which the updated meter information is provided can be specified by a user for which the data is being provided. For example, a power company (or another user) can request to receive updated meter information every 20 minutes. In this example, the update rate for each of the power company's power meters can be set equal to 20 minutes. As described above, the unit interval for the transmissions from power meters (and other nodes) can be set less than or equal to the update rate so that the updated meter information is available within the specified update rate.

Using the unit interval (or the update rate) and the number of bits required to provide the updated meter information for a meter, a minimum bit rate can be computed for the meters, where the minimum bit rate is the lowest bit rate at which the number of bits required to provide the updated meter information can be provided within the unit interval. The number of bits that are required to provide the updated meter information can depend on the particular meter information that is included in the updated meter information. For example, updated meter information that includes only a measure of power consumption over a past day can require fewer bits than updated meter information that includes full meter read information (e.g., a 7.2 digit meter read and other meter data). Thus, assuming that 6 bits are required to provide the updated meter information, the minimum bit rate for transmissions from each the power company's power meters is 6 bits per unit interval.

In some implementations, a single specified update rate can be specified for all updated meter information from all of the meters. In other implementations, separate update rates can be specified for different types of updated meter information and/or for different types of meters. In these implementations, a default update rate (e.g., daily updates) may be specified for some updated meter information and/or types of meters, while more frequent updates (e.g., hourly updates) can be specified for other updated meter information and/or types of meters.

For example, assume that a power company is interested in receiving billing information (i.e., information with which a cost of power consumption, such as total power consumption and/or peak power consumption) from residential meters (i.e., meters installed at a residential location) on a daily basis and from commercial meters (i.e., meters installed at a commercial location) on an hourly basis. The power company can also request that line voltage amplitudes be provided from a specified set of meters on an hourly basis, where the set of meters includes commercial and residential power meters. In this example, a daily update rate can be specified for updated meter information that includes the billing information (either alone or with other information) from residential meters, while an hourly update rate can be specified for updated billing information from commercial meters. Additionally, an hourly update rate can be specified for line voltage amplitudes that are received from the set of meters.

In this example, the baseline data rate for each of the meters can be set to the minimum data rate that is required to provide all of the updated meter information in a shortest unit interval for the meter. For example, the baseline data rate for a residential meter that is required to provide billing information on a daily basis and a line voltage amplitude on an hourly basis can be computed using the number of bits that is required to provide both the billing information and line voltage amplitude in a one hour unit interval, since this is the shortest unit interval for the meter. Computing the baseline data rate using the maximum number of bits required to provide all of the updated meter information over the shortest unit interval ensures that the full set of updated meter information can be provided with the specified update rate.

Alternatively, the baseline data rate for each meter can be dynamically adjusted for each unit interval based on the length of the unit interval and the number of bits that are required to provide the updated meter information for that unit interval. In the example above, a residential meter that has been selected to provide an hourly line voltage amplitude and daily billing information can have two baseline data rates. The first baseline data rate can be a data rate at which the voltage amplitude data can be provided over an hour long unit interval. This baseline data rate can be used for 23 of the 24 hourly unit intervals in a day. The second data rate can be a data rate at which the voltage amplitude and the billing information can be provided over an hour long unit interval, and can be used for the $24^{th}$ unit interval of the day. Adjusting the baseline data rate in this manner enables use of two different modulation techniques depending on the amount of data being provided.

As described above, the amount of data that is required to be sent over each unit interval can vary. Additionally, the bandwidth that is available for transmitting updated meter information can vary over time. Therefore, it is possible that sufficient bandwidth is not available for transmission of all requested meter information during a particular unit interval.

In some implementations, updated meter information can be stored until sufficient bandwidth is available to transmit the full set of updated meter information. In other implementations, the updated meter information that is sent during a particular unit interval can be adjusted based on the available bandwidth. For example, a user may request to receive both billing information and line voltage amplitudes every hour, but also specify that in the event that all information can't be provided during a single unit interval, the billing information should be transmitted without the line voltage amplitudes. In this example, the baseline data rate can have a first rate that is used when sufficient bandwidth is available to provide all requested meter information, and a second rate that is used when sufficient bandwidth is not available. Thus, the baseline data rate for a meter can be selected from a set of data rates according to the particular updated meter information that is to be sent during a particular unit interval.

A set of available modulation techniques are obtained (204). In some implementations, the set of available modulation techniques include at least two modulation techniques. The set of modulation techniques for a particular meter can be a set of modulation techniques with which the meter can encode data that are transmitted over a channel. For example, the set of modulation techniques for a particular meter can include each modulation technique that a data encoder and/or transmitter is configured to use to encode data.

In some implementations, data (e.g., modulation identifiers) representing the set of modulation techniques that each meter can use to encode data can be stored in a data store. The data store can store a set of meter identifiers (or other node identifiers) that represent meters that are installed in a service network and modulation identifiers that represent the modulation techniques that are associated with each of the meters (i.e., modulation techniques that each meter is capable of using to encode data). The set of modulation techniques that are associated with each meter can include one or more of the following modulation techniques:frequency shift keying (FSK)(e.g., binary FSK or any other m-ary FSK technique, such as 32ary FSK), PSK (phase shift keying)(e.g., Quadrature PSK or 8PSK), multiple frequency shift keying (MFSK) (e.g., 2 of 9, or 2 of 46 MFSK), Quadrature Amplitude Modulation (QAM)(e.g., 16 or 256 QAM), and relative phase shift keying as described in U.S. patent application Ser. No. 12/347,052, entitled "SYSTEM AND METHOD FOR RELATIVE PHASE SHIFT KEYING," filed on Dec. 31, 2008 (now U.S. Pat. No. 8,144,820), the disclosure of which is incorporated herein by reference. Additionally, the set of modulation techniques can include other modulation techniques (e.g., dual, triple, or quad QPSK and dual m-ary FSK among others).

A modulation technique is selected for the power meter (206). In some implementations, the selected modulation technique is selected form the set of available modulation techniques for the power meter. The selected modulation technique can be a modulation technique that is capable of providing at least the baseline data rate for the power meter. For example, assuming that the baseline data rate for a power meter is 4 bits/unit interval, the selected modulation technique can be a modulation technique with which each symbol can encode 4 bits of data. Example modulation techniques with which at least 4 bits can be encoded in each symbol include 16 QAM-256 QAM and 2 of 9 MFSK, among other modulation techniques. Additional factors such as an available channel over which the data will be transmitted, an amplitude at which the power meter can transmit data, a noise floor of the channel, and/or a signal to noise ratio (e.g., an $E_b/N_o$ ratio) for transmissions from the meter can also be considered during selection of a modulation technique for a power meter.

Determining a signal to noise threshold can be associated with the modulation technique (208). In some implementations, a signal to noise threshold for a modulation technique is a normalized (e.g., on a per-bit basis) signal to noise ratio at which data encoded according to the modulation technique are recoverable with at least a threshold confidence. The threshold confidence with which data are recoverable can be specified, for example, as a maximum bit error rate for the recovered data. For example, the signal to noise threshold for a particular modulation technique can be the $E_b/N_o$ ratio at which the bit error rate is less than or equal to $10^{-5}$. A minimum acceptable $E_b/N_o$ (i.e., energy per bit/spectral noise density) is provided as an example of a signal to noise threshold for a modulation technique, but other signal to noise thresholds can be used.

An available channel is selected for the power meter (210). In some implementations, the available channel is a portion of spectrum that is available to be allocated to the power meter, and over which transmissions from the power meter are received. For example, the available channel can include one or more sub-carriers in an OFDMA multiplexing methodology. Each available channel has a center frequency and a channel bandwidth over which transmissions from the power meter are authorized. For example, a particular channel may have a center frequency of 1 kHz and a bandwidth of 50 mHz, such that transmissions from the power meter are authorized in the spectrum that ranges from 25 mHz below 1 kHz to 25 mHz above 1 kHz.

In some implementations, selection of the available channel can be based on the signal to noise threshold for the selected modulation technique and the noise floor of each available channel. For example, assume that QPSK modulation requires an $E_b/N_o$ ratio of at least 9.5 dB to provide data recovery with a bit error rate of $10^{-5}$. Using this information, the available channel can be any channel having a spectral noise density (No) that is less than $E_b/9.5$ dB, where $E_b$ is the energy per bit that can be transmitted by the meter. The spectral noise density for each channel is computed, for example, using the noise floor of the channel and the bandwidth of the channel (e.g., when the noise is white noise, the spectral noise density=bandwidth*noise floor).

Data specifying the selected modulation technique is provided to the power meter (212). For example, assuming that a "2 of 9 MFSK" modulation technique can provide at least the baseline data rate for the power meter, data specifying the "2 of 9 MFSK" modulation technique can be provided to the power meter and/or the substation processing unit with which the meter communicates. In some implementations, the data can first be provided, for example, to the substation processing unit with which the meter communicates. In turn, the substation processing unit can retransmit the data to the power meter. In other implementations, the data can be provided directly to the power meter.

Once the power meter (or any other node) has been configured to encode data with a particular modulation technique, the meter can encode and transmit data using the selected modulation technique as long as the transmissions are providing the baseline data rate with at least the threshold confidence (e.g., with less than a maximum bit error rate and/or with at least a specified $E_b/N_o$ ratio). In some implementations, the $E_b/N_o$ ratio and/or the bit error rate of the transmissions being received from the meter can be monitored to determine whether the baseline data rate is being provided with at least the threshold confidence. When it is determined that the baseline data rate is not being provided with at least the threshold confidence, the meter can be reconfigured so that the baseline data rate is provided with at least the threshold confidence.

Figure 3:
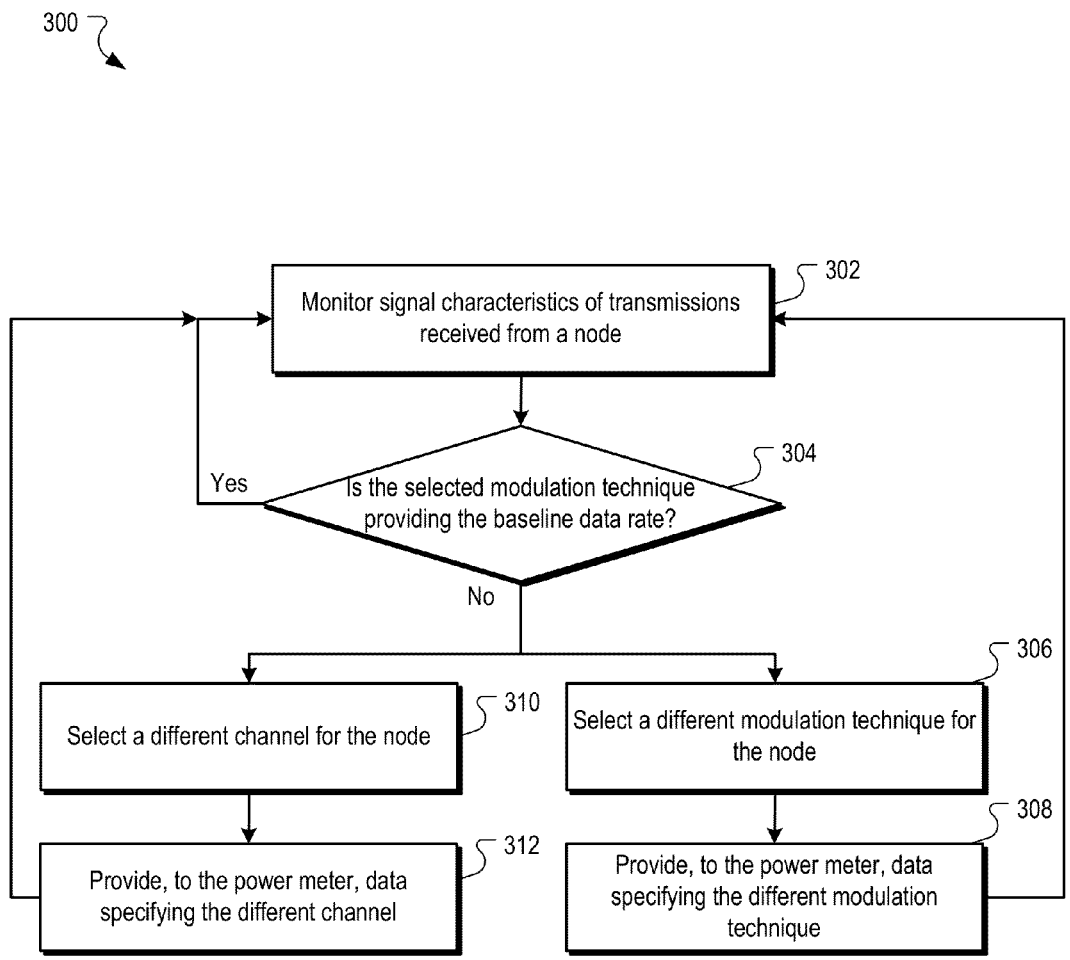
FIG. 3 is a flow chart of an example process for dynamically updating a modulation technique for a node.

FIG. 3 is a flow chart of an example process 300 for dynamically updating a modulation technique for a node. The process 300 is a process by which signal characteristics of transmissions from a node are monitored and a determination is made as to whether the selected modulation technique for the node is providing the baseline data rate with at least a threshold confidence. As long as the baseline data rate is being provided with at least the threshold confidence, the signal characteristics and/or channel characteristics continue to be monitored. If it is determined that the modulation technique is not providing the baseline data rate with at least the threshold confidence, the node is reconfigured to transmit over a different channel and/or using a different modulation technique.

The process 300 can be implemented, for example, by the modulation analysis apparatus (MAA) 120 and/or network management system 112 of FIG. 1. In some implementations, the MAA 120 includes one or more processors that are configured to perform actions of the process 300. In other implementations, a computer readable medium can include instructions that when executed by a computer cause the computer to perform actions of the process 300.

Signal characteristics of transmissions received from a node are monitored (302). The signal characteristics of the transmissions can be monitored, for example, using signal monitoring equipment that is coupled between a node and a substation processing unit. The signal characteristics can also be monitored by the substation processing unit. For example, the substation processing unit can include a receiver that measures signal characteristics (e.g., signal to noise ratios, peak amplitudes, and average amplitudes) of transmissions received over each channel. The receiver can also separately measure signal amplitudes of signals received over each channel and the noise floors of the channels over time.

Using the signal characteristics, a determination is made whether the selected modulation technique for the power meter is providing the baseline data rate with at least a threshold confidence (304). The determination that the baseline data rate is being provided with at least the threshold confidence can be made, for example, by determining that the transmissions being received have at least a minimum (threshold) $E_b/N_o$ ratio and/or have a bit error rate that is less than a maximum acceptable bit error rate (i.e., a threshold bit error rate). A determination that the baseline data rate is not being provided with at least a threshold confidence can be made, for example, by determining that the transmissions being received have less than a minimum (threshold) $E_b/N_o$ ratio and/or have a bit error rate that is greater than the threshold bit error rate.

In response to determining that the selected modulation technique is not providing the baseline data rate with at least the threshold confidence, a different modulation technique can be selected (306) and/or a different channel can be selected (310). A different modulation technique can be selected, for example, by selecting a modulation technique that provides at least the baseline data rate with at least a threshold confidence for transmissions having the monitored signal characteristics (e.g., the $E_b/N_o$ ratio) that have been measured for the monitored transmissions. The modulation technique can be selected in a manner similar to that describe above with reference to FIG. 2. When a different modulation technique is selected for the power meter, data specifying the different modulation technique is provided to the power meter (308) and the signal characteristics and/or channel characteristics continue to be monitored (302).

In some implementations, a different channel may be selected for the power meter in response to determining that transmissions over the current channel are not providing the baseline data rate with at least the threshold confidence. In these implementations, a different channel can be selected, for example, by selecting a channel having a noise floor that results in the $E_b/N_o$ ratio for the monitored transmissions being greater than the threshold $E_b/N_o$ ratio. For example, assume that the selected modulation technique has a threshold $E_b/N_o$ ratio of 14 dB in order to provide the baseline data rate with at least the threshold confidence. In this example, if the current $E_b/N_o$ ratio is 12 dB, then a channel having an $N_o$ that would result in the $E_b/N_o$ ratio of the transmissions being 14 dB or more can be selected. When a different channel is selected for the power meter, data specifying the different channel is provided to the power meter (312) and the signal characteristics continue to be monitored (302).

In some implementations, a different channel and a different modulation technique can both be selected for the power meter in response to determining that transmissions from the power meter are not providing the baseline data rate with at least the threshold confidence. In these implementations, the different channel may have a different bandwidth (e.g., wider) than the current channel, such that a different modulation scheme that requires a lower signal to noise threshold can be used.

For example, assume that the originally selected modulation technique for the power meter was a "2 of 9 MFSK" modulation technique that requires at bandwidth of at least X MHz and also requires an $E_b/N_o$ of 17 dB to provide the baseline data rate with less than a maximum bit error rate, but that the current $E_b/N_o$ has fallen to 13 dB due to an increase in the noise floor of the channel. Further assume that the maximum $E_b/N_o$ that can be achieved over the available channels is 15 dB and that the power meter is capable of using a "32ary FSK" modulation technique, which requires an $E_b/N_o$ ratio of 14 dB and also requires a bandwidth of Y MHz that is more than twice as wide as the bandwidth of X MHz. In this example, the different channel that is selected for the power meter can be a channel having a bandwidth of at least Y MHz so that the "32ary FSK" modulation technique can be selected as the different modulation technique for the power meter.

Figure 4:
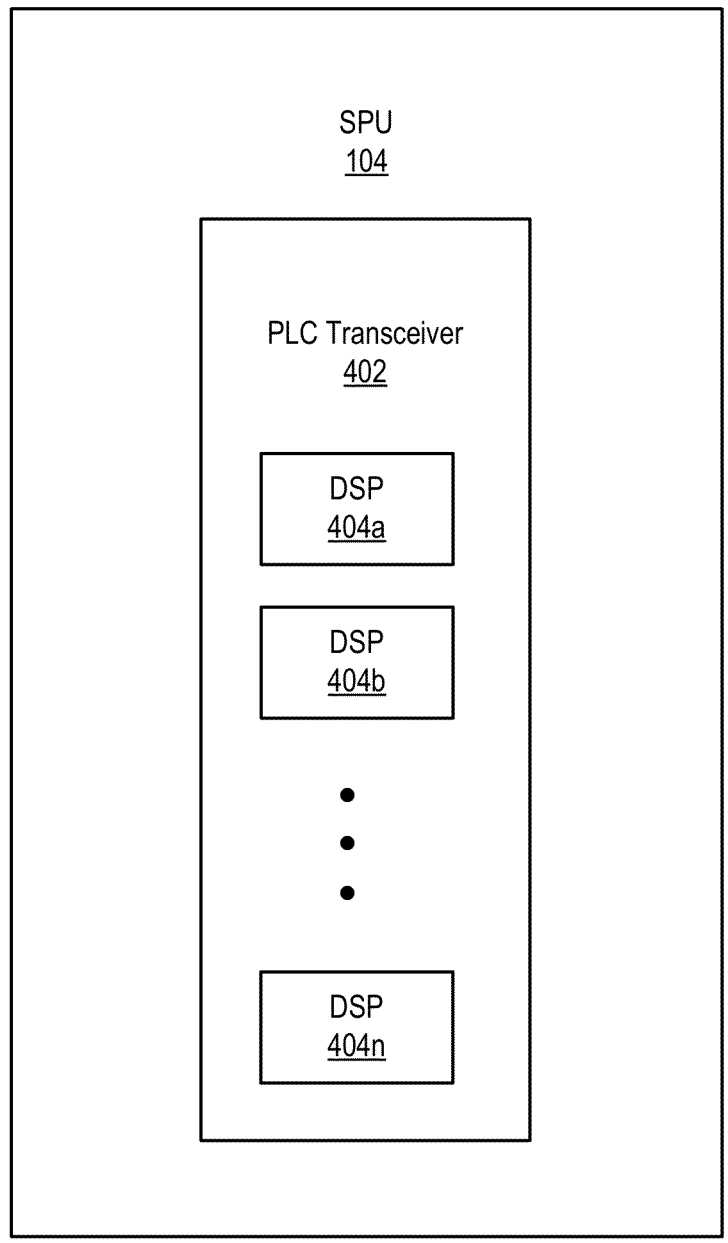
FIG. 4 is a block diagram of an example substation processing unit with which a modulation analysis apparatus can be implemented.

FIG. 4 is a block diagram of an example substation processing unit 104 with which a modulation analysis apparatus can be implemented. As described above, the substation processing unit 104 may be coupled to or otherwise in communication with thousands of different nodes, and be configured to communicate with the nodes in a unidirectional and/or bidirectional manner.

The substation processing unit 104 includes a PLC transceiver 402 and signal processors 404a-404n. The PLC transceiver 402 can communicate with each node individually by sending and/or receiving signals in a particular channel or frequency assigned to a node, as described above. For example, the PLC transceiver 402 can receive and decode (e.g., demodulate) transmissions received from nodes in a PLC network. The PLC transceiver 402 can also encode (e.g., modulate) and transmit data to the nodes in the PLC network.

The signal processors 404a-404n can be configured to receive, filter, and/or separate received transmissions into one or more channels that are assigned to the various nodes. For example, each signal processor 404 can filter the transmissions that are received by the PLC transceiver to extract transmissions that are received over a set of channels that have been assigned to the signal processor 404. In turn, the extracted transmissions can be processed to decode (e.g., demodulate) the extracted transmissions, or the extracted transmissions can be provided to other signal processors 404 that can further extract transmissions of one or more channels in the set of channels that are included in the previously extracted transmissions.

Figure 5:
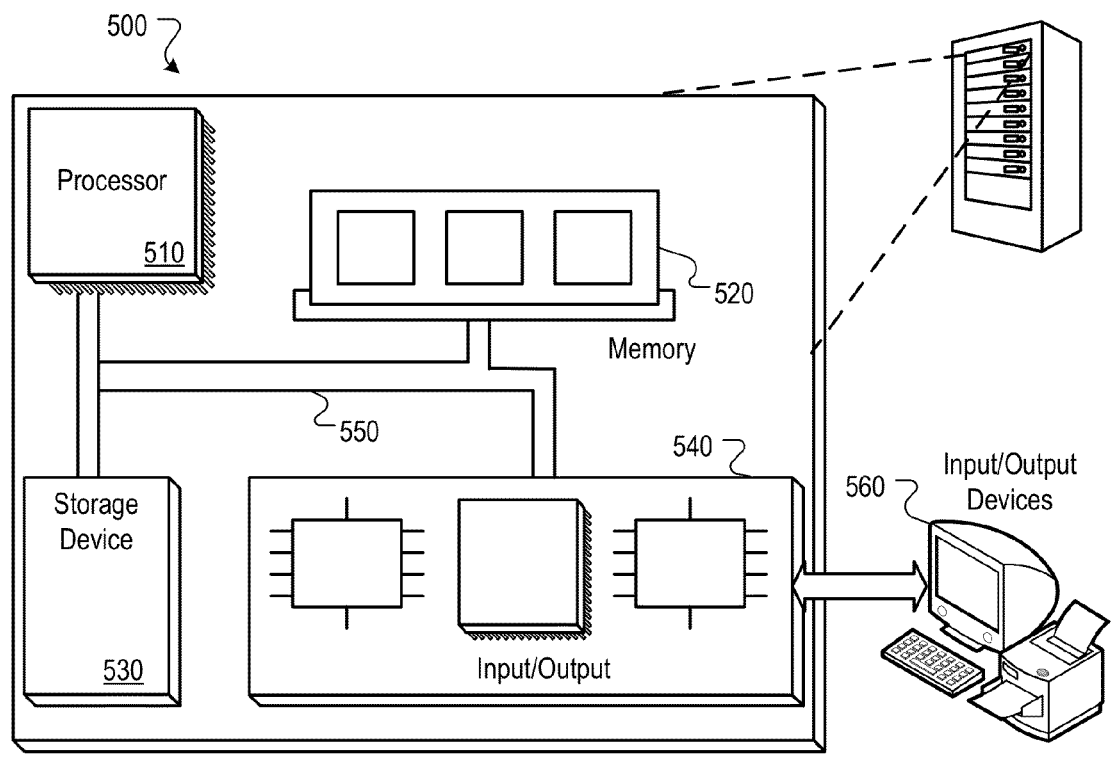
FIG. 5 is a block diagram of an example computer system that can be used to facilitate selection of modulation techniques.

FIG. 5 is a block diagram of an example computer system 500 that can be used to facilitate selection of modulation techniques. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them.

Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   obtaining data specifying a baseline data rate for transmissions from a node that are received over a channel of a power line communications system, the channel being one of a plurality of available channels allocated for communications with the node;
   providing, to the node, data specifying a selected modulation technique;
   selecting an available channel for a selected one of a plurality of modulation techniques based on an assessment of data transmission efficiency of the data transmitted from the node, wherefrom the node is reconfigured to transmit over at least one of a different channel and a different modulation technique;
   determining a noise-tolerance threshold associated with the selected modulation technique, the noise-tolerance threshold for the modulation technique being a measure at which the modulation technique provides the baseline data rate with at least a threshold confidence; and
   selecting an available channel, from among the plurality of available channels, for the node in response to the step of determining, the selected channel being a channel over which the selected modulation technique can provide the baseline data rate with at least the threshold confidence.

2. The method of claim 1, wherein the noise-tolerance threshold includes a signal to noise threshold associated with the selected modulation technique, and wherein selecting an available channel includes assessing respective noise floors corresponding to each of the plurality of available channels, each available channel of the plurality of available channels being in a portion of a spectrum that is available to be allocated for transmissions from the node, and each available channel having a channel bandwidth for and over which transmissions from the node are configured.

3. The method of claim 2, wherein the signal to noise threshold for the selected modulation technique is a minimum signal to noise measure at which the selected modulation technique provides the baseline data rate with the threshold confidence.

4. The method of claim 1, wherein determining a noise-tolerance threshold comprises determining a threshold $E_b/N_o$ ratio at which the selected modulation technique provides the baseline data rate with less than a specified bit error rate, where $E_b/N_o$ ratio is a ratio of energy per bit relative to a spectral noise density for the transmissions.

5. The method of claim 1, further comprising providing data that cause presentation of a user interface that accepts user input specifying the baseline data rate.

6. The method of claim 1, further comprising obtaining a set of available modulation techniques,
wherein obtaining the set comprises receiving data, from a data store, specifying the set of available modulation techniques that are associated with the node.

7. The method of claim 6, wherein the set of available modulation techniques comprises at least two modulation techniques selected from a set consisting of PSK, FSK, QAM, and MFSK modulation techniques.

8. The method of claim 1, further comprising:
monitoring signal characteristics of transmissions from the node, the transmissions being data that are encoded using the selected modulation technique;
determining that the selected modulation technique is not providing at least the baseline data rate with at least the threshold confidence;
selecting, based on the monitored signal characteristics, a different modulation technique for the node, the different modulation technique being a modulation technique that provides, for transmissions having the monitored signal characteristics, at least the baseline data rate with at least the threshold confidence; and
providing data to the node specifying the different modulation technique.

9. The method of claim 8, wherein determining that the selected modulation technique does not provide at least the baseline data rate with at least the threshold confidence comprises determining that a bit error rate for the monitored transmissions is higher than a threshold bit error rate.

10. The method of claim 1, wherein the node is a utility meter, and obtaining data specifying the baseline data rate comprises obtaining data specifying a bit rate at which updated meter information is provided with a specified update rate.

11. The method of claim 10, wherein the utility meter is a power meter, and the updated meter information is one of billing information with which a cost of power consumption is computed, and line voltage information that specifies a line voltage amplitude at the power meter.

12. An apparatus comprising:
means, including first circuitry, for obtaining data specifying a baseline data rate for transmissions from a node that are received over a channel of a power line communications system, the channel being one of a plurality of available channels allocated for communications with the node;
means, including second circuitry, for providing, to the node, data specifying a selected modulation technique;
means, including third circuitry, for selecting an available channel for a selected one of a plurality of modulation techniques based on an assessment of data transmission efficiency of the data transmitted from the node, wherefrom the node is reconfigured to transmit over at least one of a different channel and a different modulation technique;
means, including fourth circuitry, for determining a noise-tolerance threshold associated with the selected modulation technique, the noise-tolerance threshold for the modulation technique being a measure at which the modulation technique provides the baseline data rate with at least a threshold confidence; and
means, including fifth circuitry and in response to the means for determining, for selecting an available channel for the node, the selected channel being a channel over which the selected modulation technique can provide the baseline data rate with at least the threshold confidence.

13. An apparatus comprising:
a first circuit module configured and arranged to obtain data specifying a baseline data rate for transmissions from a node that are received over a channel of a power line communications system, the channel being one of a plurality of available channels allocated for communications with the node;
a second circuit module configured and arranged to provide, to the node, data specifying a selected modulation technique;
a third circuit module configured and arranged to select an available channel for a selected one of a plurality of modulation techniques based on an assessment of data transmission efficiency of the data transmitted from the node, wherefrom the node is reconfigured to transmit over at least one of a different channel and a different modulation technique;
a fourth circuit module configured and arranged to determine a noise-tolerance threshold associated with the selected modulation technique, the noise-tolerance threshold for the modulation technique being a measure at which the modulation technique provides the baseline data rate with at least a threshold confidence; and
a fifth circuit module configured and arranged to, in response to the fourth circuit module, select an available channel for the node, the selected channel being a channel over which the selected modulation technique can provide the baseline data rate with at least the threshold confidence.

14. The apparatus of claim 12, wherein the means for selecting is configured for obtaining a set of available modulation techniques,
wherein obtaining the set comprises receiving data, from a data store, specifying the set of available modulation techniques that are associated with the node; and
wherein the set of available modulation techniques comprises at least two modulation techniques selected from a set consisting of PSK, FSK, QAM, and MFSK modulation techniques.

15. The apparatus of claim 12, wherein the means for selecting is configured for obtaining a set of available modulation techniques, at least two modulation techniques selected from a set consisting of PSK, FSK, QAM, and MFSK modulation techniques; and wherein the means for determining comprises means for determining that a bit error rate for the transmissions is higher than a threshold bit error rate.

16. The apparatus of claim 12, wherein the node is a utility meter, and obtaining data specifying the baseline data rate comprises obtaining data specifying a bit rate at which updated meter information is provided with a specified update rate; and wherein the utility meter is a power meter, and the updated meter information is one of billing information with which a cost of power consumption is computed, and line voltage information that specifies a line voltage amplitude at the power meter.

17. The apparatus of claim 12, wherein the noise-tolerance threshold includes a signal to noise threshold associated with the selected modulation technique.

18. The apparatus of claim 17, wherein the signal to noise threshold for the selected modulation technique is a minimum signal to noise measure at which the selected modulation technique provides the baseline data rate with the threshold confidence.

19. The apparatus of claim 12, wherein the means for determining a noise-tolerance threshold comprises means for determining a threshold $E_b/N_o$ ratio at which the selected modulation technique provides the baseline data rate with less than a specified bit error rate, where $E_b/N_o$ ratio is a ratio of energy per bit relative to a spectral noise density for the transmissions.

20. The apparatus of claim 12, further comprising means for providing data that cause presentation of a user interface that accepts user input specifying the baseline data rate.

* * * * *